(12) United States Patent
Agarwal et al.

(10) Patent No.: US 10,242,336 B1
(45) Date of Patent: Mar. 26, 2019

(54) INVENTORY AND DELIVERY MANAGEMENT

(71) Applicant: Amazon Technologies, Inc., Seattle, WA (US)

(72) Inventors: Vaibhav Agarwal, Gonda (IN); Udit Gangwani, Surat (IN); Shubham Sisodia, Uttar (IN); Venkataramanan Subramanian, Hyderabad (IN)

(73) Assignee: Amazon Technologies, Inc., Seattle, WA (US)

( * ) Notice: Subject to any disclaimer, the term of this patent is extended or adjusted under 35 U.S.C. 154(b) by 977 days.

(21) Appl. No.: 14/558,494

(22) Filed: Dec. 2, 2014

(51) Int. Cl.
  *G06Q 10/08* (2012.01)
  *G06Q 30/06* (2012.01)
  *G06Q 30/00* (2012.01)

(52) U.S. Cl.
  CPC ......... *G06Q 10/087* (2013.01); *G06Q 10/083* (2013.01); *G06Q 30/0635* (2013.01)

(58) Field of Classification Search
  CPC .... G06Q 10/087; G06Q 10/083; G06Q 30/06; G06Q 30/0635
  See application file for complete search history.

(56) References Cited

U.S. PATENT DOCUMENTS

| | | | | |
|---|---|---|---|---|
| 9,916,562 B1* | 3/2018 | Armato | ................ | G06Q 10/087 |
| 2012/0265561 A1* | 10/2012 | Patro | ..................... | G06Q 30/06 |
| | | | | 705/5 |
| 2014/0047097 A1* | 2/2014 | Buehl | .................. | G06Q 10/087 |
| | | | | 709/224 |
| 2014/0279294 A1* | 9/2014 | Field-Darragh | ..... | G06Q 10/087 |
| | | | | 705/28 |
| 2016/0055502 A1* | 2/2016 | Pitz | .................... | G06Q 30/0205 |
| | | | | 705/7.34 |
| 2016/0140490 A1* | 5/2016 | Kliper | .................... | G06N 7/005 |
| | | | | 705/28 |
| 2017/0270472 A1* | 9/2017 | High | .................... | G06Q 10/083 |
| 2018/0158015 A1* | 6/2018 | Ouyang | ............... | G06Q 10/087 |
| 2018/0247256 A1* | 8/2018 | Takigawa | ............... | G06N 7/005 |

OTHER PUBLICATIONS

Yashoda Kiran Lingam "The role of Artificial Intelligence (AI) in making accurate stock decisions in E-commerce industry" International Journal of Advance Research, Ideas and Innovations in Technology (vol. 4, Issue 3) © 2018, pp. 2281-2286 (Year: 2018).*

* cited by examiner

*Primary Examiner* — Naeem U Haq
(74) *Attorney, Agent, or Firm* — Kilpatrick Townsend & Stockton LLP

(57) ABSTRACT

Techniques for determining an inventory level for an ordered item and offering delivery for the ordered item within a time frame may be provided. Information about a plurality of merchants may be maintained. An inventory level of the plurality of merchants for an item ordered by a customer may be determined based on the information and a threshold associated with the item. A particular merchant that is within a geographic range of the customer may be selected based on the inventory level and the merchant information. In an example, delivery instructions may be provided to a delivery service for delivering the item to the customer within the time frame.

15 Claims, 7 Drawing Sheets

INVENTORY AND DELIVERY MANAGEMENT

BACKGROUND

Brick and mortar merchants could previously only reach customers that enter their premises; however, with the advent of current network technologies some merchants can now reach customers via web pages and online advertisements. A customer can now order items from a variety of merchants that are located in other parts of the country or from other countries via online ordering features. However, problems exist when items are ordered from merchants with which the customer has no previous experience. Ordering items from unfamiliar merchants may lead to the receipt of poor quality items, experiences with poor customer service, or unexpectedly long delivery times. For example, a customer may be provided with a large delivery window for an item that they have ordered. The large delivery window may lead to security and delay problems such as the item being delivered when the customer is not present to receive the item. The delivery service may either leave the item unattended or come back at a later time for re-delivery. Additionally, merchants may lose out on potential sales as the customer may decide to not order an item given the long delivery period.

BRIEF DESCRIPTION OF THE DRAWINGS

Various embodiments in accordance with the present disclosure will be described with reference to the drawings, in which.

DETAILED DESCRIPTION

Figure 1:
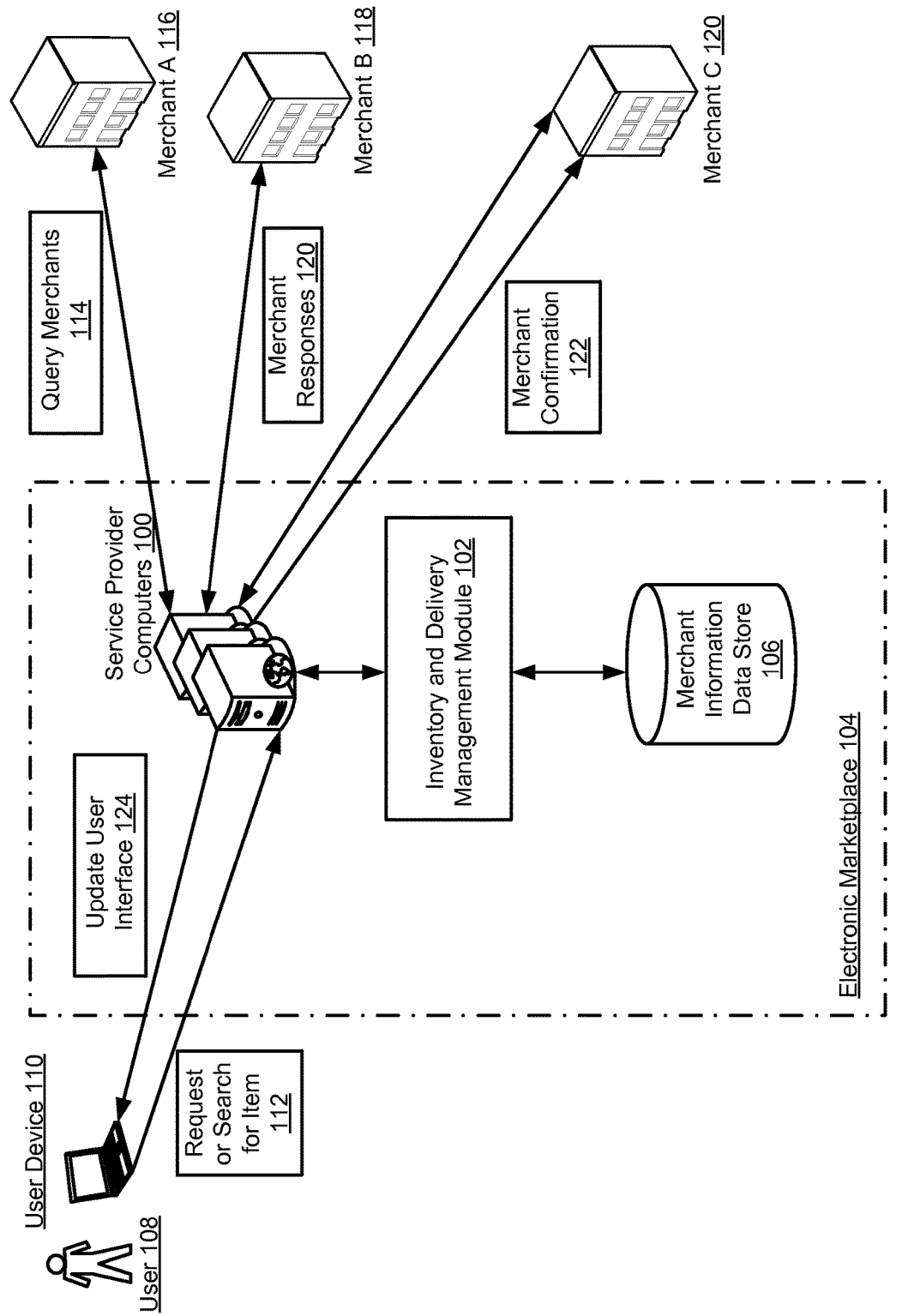
FIG. 1 is a block diagram that illustrates an example of inventory and delivery management as described herein, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems, methods, and computer-readable medium for providing inventory and delivery management for items ordered online via an electronic marketplace or other online item ordering/delivery service. In some examples, using such inventory and delivery management, the ordered items may be able to be sourced from local merchants, within a geographic range of the customer, and provided to the customer within a relatively short time (e.g., within a few hours or so). In accordance with at least one embodiment, a service provider may register merchants within a geographic region and obtain information about each merchant. The merchants may indicate their willingness to participate in the inventory and delivery management service of the service provider, provide a broad category of items offered, and provide contact information such as mobile telephone numbers, instant messenger contact information, or email information. The service provider may maintain the information about the merchants and update the information based on feedback received from the merchants.

In a non-limiting example, a user may utilize a computing device to navigate to a package of diapers offered by an electronic marketplace associated with a service provider. Upon receiving a search or request for the package of diapers, the service provider may utilize information about a set of merchants within a geographic range of the user to determine if a local seller can fulfill an order for the diapers within a specific delivery window (e.g., three hours or the like). The service provider may query a number of merchants based at least in part on the location of the merchant and/or a determination about potential inventory of the merchant for a likelihood of successful fulfillment within the delivery window. Based at least in part on responses received from the set of merchants local to the user, the service provider may provide information to a particular merchant indicating that they have been selected to fulfill the order while simultaneously indicating to the user (e.g., via a browser application or the like) that the item is available for delivery within the delivery window. The user may indicate their acceptance of this delivery arrangement, upon which instructions may be provided to a logistic agent that can deliver the item from the merchant to the user within the delivery window.

In an embodiment, the service provider may receive a request or search from a customer for an item offered by an electronic marketplace or other online goods provider associated with the service provider. The service provider may query the customer for or determine the customer's location. Additionally, the service provider may determine an inventory level of merchants for the item included in the request or search based on a machine learning algorithm utilizing the information about the merchants. For example, the machine learning algorithm may determine which merchants should be queried for item fulfillment based at least in part on an indication of a seller's probability of successfully fulfilling the order. The probability of success may be based at least in part on previously fulfilled orders for similar items by the merchant (e.g., within a certain time frame). Based at least in part on the customer's location, the inventory level determination, and/or the probability of success, the service provider may query a subset of merchants that are local to the customer.

In accordance with at least one embodiment, the query provided by the service provider may include information about the item being ordered and a price which the merchants are capable of meeting in order to be selected to fulfill the item. The service provider may use the merchants' responses to the query and merchant ratings to select a particular merchant to fulfill the order for the item within the time frame. In embodiments, after the particular merchant has been selected, the service provider may indicate (e.g., via a user interface) to the customer that delivery of the item may be available within the time frame. Based on the customer's response to the indication, the service provider may provide instructions to a logistic agent or delivery service to provide the item included in the order to the customer via the selected merchant within the certain time frame.

In some examples, the service provider may utilize the machine learning algorithm (e.g., using the information about the merchants) to determine an inventory level for an item being ordered by a customer and determine if the order can be fulfilled within a certain time frame by a local merchant. In some examples, the customer may still be able to order the item even if the service provider determines that the item cannot be fulfilled by a local merchant within the time frame. However, the fulfillment of the order in this case may include a longer delivery schedule than described above as the delivery may performed more conventionally.

FIG. 1 is a block diagram that illustrates an example of inventory and delivery management in accordance with at least one embodiment. In embodiments, the inventory and delivery management may be implemented by one or more service provider computers 100 using an inventory and delivery management module 102 within an electronic marketplace 104. The inventory and delivery management module 102 may maintain information about a plurality of merchants within a data store, such as data store 106. In accordance with at least one embodiment, a user 108 using a user device 110 displaying a user interface (such as a mobile telephone or laptop computer) may request or search for an item 112 offered by the electronic marketplace 104. The one or more service provider computers 100 using the inventory and delivery management module 102 may determine an inventory level of the item included in the request or search 112 for the merchants. The inventory and delivery management module 102 may be configured to use a machine learning algorithm that utilizes the merchant information maintained on data store 106 to determine the inventory level for the item. In an embodiment, the service provider computers 100 via the inventory and delivery management module 102 may query 114 a subset of merchants 116-120 for their availability to fulfill the order 112 within a time frame.

The query 114 may provide information about the order 112 to the merchants 116-120 such as an order identifier, an expected price that the merchants 116-120 should meet or be below, and the quantity of the item to be provided. The merchants 116-120 may provider their responses 120 to the query 114 which may indicate their willingness to participate and the price at which they wish to fulfill the order for the item. The inventory and delivery determination module 102 may select a particular merchant from the subset of merchants 116-120 based at least in part on the merchant responses 120, the location of the merchants 116-120 to the user 108, and ratings associated with each merchant that may be maintained in the data store 106.

In accordance with at least one embodiment, the service provider computers 100 via the inventory and delivery management module 102 may provide merchant confirmation 122 to a particular merchant 120 indicating to the seller that they have been selected to fulfill the order for the item at a particular price within a certain time frame. The merchant confirmation 122 may also include information about a logistic agent or delivery service (e.g., one or more delivery agents) that will arrive within the time frame to deliver the item to the user. In embodiments, the service provider computers 100 may be configured to provide an instruction to update the user interface 124 indicating to the user that the item in the order can be delivered to them within the time frame. As described herein, upon the user selecting the fulfillment of the order within the time frame via the updated user interface, instructions may be provided by the service provider computers 100 to the logistic agent to pick up the item from the selected merchant 120 and deliver the item to the user 108 within the time frame.

Figure 2:
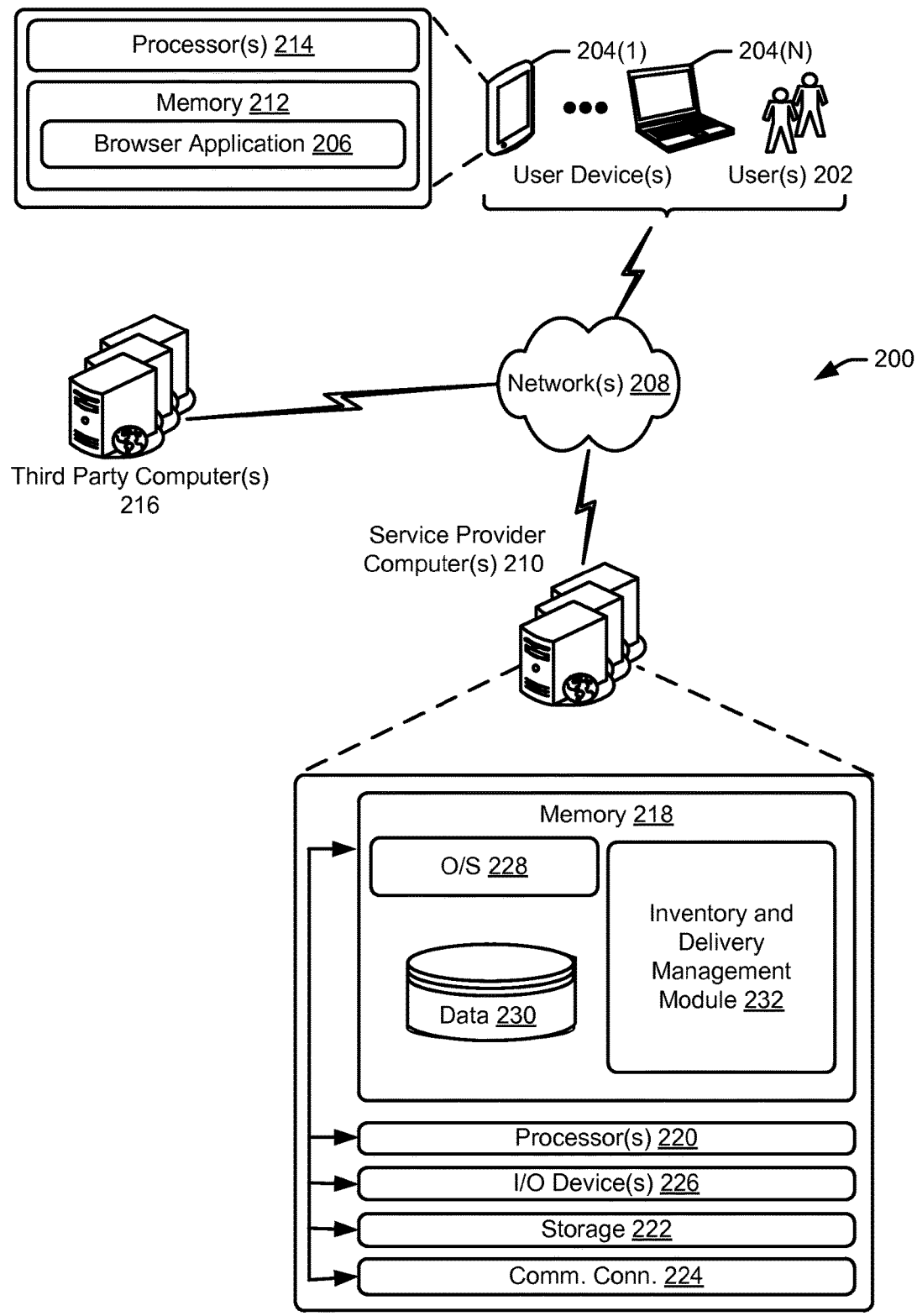
FIG. 2 illustrates an example architecture for implementing the inventory and delivery management as described herein that includes one or more service provider computers and/or a user device connected via one or more networks, in accordance with at least one embodiment.

FIG. 2 illustrates an example architecture for inventory and delivery management as described herein that includes one or more service provider computers and/or a user device connected via one or more networks in accordance with at least one embodiment. In architecture 200, one or more users 202 (such as the user 108 from FIG. 1) may utilize user computing devices 204(1)-(N) (collectively, user devices 204 such as the user device 110 in FIG. 1) to access a browser application 206 (e.g., a web browser) or a user interface (UI) accessible through the browser application 206, via one or more networks 208 to provide an item order network document associated with the inventory and delivery management as described herein. The "browser application" 206 can be any browser control or native application that can access and display a network document or other information. In some embodiments, the user computing device 204 may be configured to receive an indication that the item included in the order may be delivered within a certain time frame according to the inventory and delivery management as described herein. In some aspects, the browser application 206 may display an interactive user interface (UI) for providing order requests and input related to delivery of an ordered item within a time frame from a local merchant within a certain geographic range of the user. In an embodiment, the service may identify a subset of merchants from a plurality of merchants for fulfilling a user's request for an item within a time frame based on a geographic range where the geographic range corresponds to the geographic location of the customer. In some aspects, the browser application 206 may be hosted, managed, and/or provided by a computing resources service or service provider, such as by utilizing one or more service provider computers 210 that are associated with or configured to enable the inventory and delivery management. The one or more service provider computers 210 may, in some examples, provide computing resources such as, but not limited to, client entities, low latency data storage, durable data storage, data access, management, virtualization, cloud-based software solutions, electronic content performance management, etc. The one or more service provider computers 210 may also be operable to provide web hosting, computer application development, and/or implementation platforms, combinations of the foregoing, or the like to the one or more users 202.

In one illustrative configuration, the user computing devices 204 may include at least one memory 212 and one or more processing units or processor(s) 214. The processor(s) 214 may be implemented as appropriate in hardware, computer-executable instructions, firmware, or combinations thereof. Computer-executable instruction or firmware implementations of the processor(s) 214 may include computer-executable or machine-executable instructions written in any suitable programming language to perform the various functions described herein. The user devices 204 may also include geo-location devices (e.g., a global positioning system (GPS) device or the like) for providing and/or recording geographic location information associated with the user devices 204. In accordance with at least one embodiment, the geographic location information may be used by the inventory and delivery management feature to locate merchants that are close to the user.

The memory 212 may store program instructions that are loadable and executable on the processor(s) 214, as well as data generated during the execution of these programs. Depending on the configuration and type of user device 204, the memory 212 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 212 may include multiple different types of memory, such as static random access memory (SRAM), dynamic random access memory (DRAM), or ROM.

Turning to the components of the memory 212 in more detail, the memory 212 may include an operating system and one or more application programs or services for implementing the features disclosed herein including providing order information for an item offered by an electronic marketplace and input related to opting in for delivery of the item within a time frame from a local merchant. The browser application 206 may be configured to provide or display a user interface for the user 202 to interact with when ordering an item via the one or more service provider computers 210 as described herein. Additionally, the memory 212 may store access credentials and/or other user information such as, but not limited to, user IDs, passwords, and/or other user information. In some examples, the user information may include information for authenticating an account such as, but not limited to, a device ID, a cookie, an IP address, a location, or the like. In addition, the user information may include a user 202 provided response to a security question or a geographic location obtained by the user device 204.

In some examples, the networks 208 may include any one or a combination of many different types of networks, such as cable networks, the Internet, wireless networks, cellular networks and other private and/or public networks. While the illustrated example represents the users 202 accessing the browser application 206 over the networks 208, the described techniques may equally apply in instances where the users 202 interact with the one or more service provider computers 210 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the browser application 206 may allow the users 202 to request or search for an item via a user interface provided by the one or more service provider computers 210 that may trigger the inventory and delivery management as describe herein. The one or more service provider computers 210, perhaps arranged in a cluster of servers or as a server farm, may host the browser application 206 and/or cloud-based software services. Other server architectures may also be used to host the browser application 206 and/or cloud-based software services. The browser application 206 may be capable of handling requests from many users 202 and serving, in response, various user interfaces that can be rendered at the user devices 204 such as, but not limited to, a website or network document. The browser application 206 can interact with any type of website that supports user interaction, including social networking sites, electronic retailers, informational sites, blog sites, search engine sites, news and entertainment sites, and so forth. The described techniques can similarly be implemented outside of the browser application 206, such as with other applications running on the user device 204.

The one or more service provider computers 210 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 210 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 210 may be in communication with the user device 204 via the networks 208, or via other network connections. The one or more service provider computers 210 may include one or more servers, perhaps arranged in a cluster or as individual servers not associated with one another. The one or more service provider computers 210 may be in communication with one or more third party computers 216 via networks 208. The one or more service provider computers 210 that host the browser application 206 may obtain and provide data to third party computers 216 via networks 208 in accordance with embodiments described herein. The one or more third party computers 216 may be queried for merchant responses regarding an order for a user and may provide information about the merchant. For example, the service provider computers 210 may query a subset of determined merchants for responses regarding an order from a user and provide confirmation information to the merchant via the third party computers 216.

In one illustrative configuration, the one or more service provider computers 210 may include at least one memory 218 and one or more processing units or processors(s) 220. The processor(s) 220 may be implemented as appropriate in hardware, computer-executable instructions, firmware, or combinations thereof. Computer-executable instruction or firmware implementations of the processor(s) 220 may include computer-executable or machine-executable instructions written in any suitable programming language to perform the various functions described. The memory 218 may store program instructions that are loadable and executable on the processor(s) 220, as well as data generated during the execution of these programs. Depending on the configuration and type of the one or more service provider computers 210, the memory 218 may be volatile (such as RAM) and/or non-volatile (such as ROM, flash memory, etc.). The one or more service provider computers 210 or servers may also include additional storage 222, which may include removable storage and/or non-removable storage. The additional storage 222 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 218 may include multiple different types of memory, such as SRAM, DRAM, or ROM.

The memory 218, the additional storage 222, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 222 are all examples of computer storage media. Additional types of computer storage media that may be present in the one or more service provider computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the one or more service provider computers 210. Combinations of any of the above should also be included within the scope of computer-readable media. Alternatively, computer-readable communication media may include computer-readable instructions, program modules, or other data transmitted within a data signal, such as a carrier wave, or other transmission. However, as used herein, computer-readable storage media does not include computer-readable communication media.

The one or more service provider computers 210 may also contain communication connection(s) 224 that allow the one or more service provider computers 210 to communicate with a stored database, another computing device or server, user terminals and/or other devices on the networks 208. The one or more service provider computers 210 may also include I/O device(s) 226, such as a keyboard, a mouse, a pen, a voice input device, a touch input device, a display, speakers, a printer, etc.

Turning to the contents of the memory 218 in more detail and as will be described in further detail in FIG. 3, the memory 218 may include an operating system 228, one or more data stores 230, and/or one or more application programs or services for implementing the features disclosed herein including an inventory and delivery management module 232. The inventory and delivery management module 232 may be an example of the inventory and delivery management module 102 from FIG. 1. In accordance with at least one embodiment, the inventory and delivery management module 232 may be configured to, in response to receiving an search or request for an item from a user, determine an inventory level for the item based on a machine learning algorithm utilizing information about a plurality of merchants, and select a particular merchant from a queried subset of merchants to deliver the item to the user within a time frame by a logistic agent as described herein.

Figure 3:
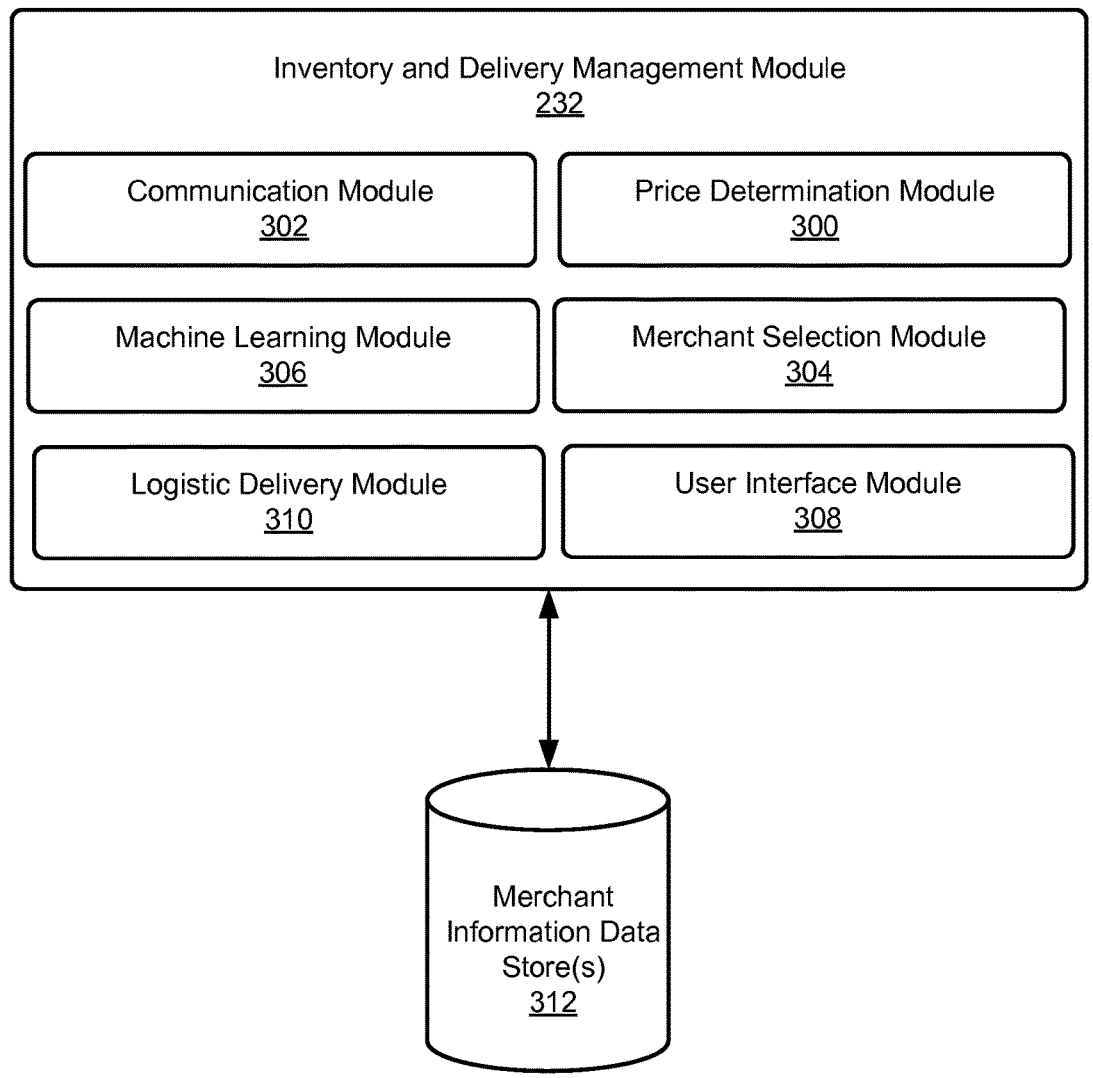
FIG. 3 is a schematic diagram that illustrates an example of an inventory and delivery management module and associated data stores in accordance with at least one embodiment.

FIG. 3 is a schematic diagram that illustrates an example of an inventory and delivery management module and associated data stores in accordance with at least one embodiment. It should be noted that while multiple modules are described in the example inventory and delivery management module 232, the processes and methods described herein can be performed by more or less modules within memory such as memory 218 described above. In addition, while the modules 300-310 included in inventory and delivery management module 232 are displayed and described as distinct modules, in some embodiments they may be included within one another to further facilitate methods and systems described herein. In accordance with at least one embodiment, the inventory and delivery management module 232 may include a price determination module 300, a communication module 302, a merchant selection module 304, a machine learning module 306, a user interface module 308, and a logistic delivery module 310 in communication with one or more data stores 312 (which may be an example of the one or more data stores 230 from FIG. 2).

In accordance with at least one embodiment, the inventory and delivery management module 232 may be configured to receive and maintain merchant registration information which may be included in information about the merchant in data store 312. As described above, a merchant may provide information about a category of item they offer, their location, contact information, and whether they wish to opt-in to the inventory and delivery management feature described herein. Additionally, the inventory and delivery management module 232 in conjunction with the communication module 302 may maintain information about a rating regarding the merchant's ability to fulfill an order after being selected according to features described herein. In embodiments, the inventory and delivery management module 232 may be configured to determine an inventory level for an item included in a received order. The inventory and delivery management module 232 with the machine learning module 306 may utilize the information about the merchants or the plurality of merchants to determine an inventory level for an item. The machine learning module 306 may use merchant responses to queries provided by the inventory and delivery management module 232 to predict the inventory level of an item ordered at a specific time and day with in a calendar year from a geographic region. The merchant responses, successful fulfilled orders, and merchant ratings can also be utilized to determine an inventory level for an item included in a received order. Merchant ratings indicate the ability for the merchant to fulfill orders after being selected by the service provider. Merchant ratings can be provided by the customer or user who placed the order for the item and utilized by the merchant selection module 304 to select a particular merchant to fulfill the order. In accordance with at least one embodiment, the user interface generated by user interface module 308 may provide the merchant ratings of the selected merchant that is fulfilling the order to the user. The user can provide input via the user interface if the merchant ratings are lower than they would like and the inventory and delivery management module 232 and merchant selection module 304 may select another merchant for fulfilling the order.

The inventory and delivery management module 232 with the machine learning module 306 may be configured to determine a time frame that the order may be fulfilled using the merchant information and order information such as the customer's location information. The determined inventory level may also be utilized by modules 232 and 306 to determine an appropriate time frame for delivery and fulfillment of the received order to the customer/user. In accordance with at least one embodiment, the inventory and delivery management module 232 and the machine learning module 306 may utilize the information about the plurality of merchants, information about the item ordered, and seller ratings to determine a probability that local merchants can fulfill the order. In embodiments, the inventory and delivery management module 232 compares the probability to a threshold for the item to determine if the option of delivering the item within a certain time frame should be offered to the user. The probability may represent the likelihood that local merchants will have the inventory to fulfill the order and will be willing to fulfill the order within a time frame for a certain price. Thresholds of availability for each item offered by the retailer or electronic marketplace associated with the inventory and delivery management feature described herein may be maintained in the data stores 312. Thresholds may also be dynamically updated by the machine learning module 306 using merchant information and merchant responses to previous orders for items either fulfill or unfulfilled. In an embodiment, the inventory and delivery management module 232 and the machine learning module 306 may utilize information from third parties to determine the inventory level for an item. Information obtained from third parties can be received via the communication module 302 and include price information for similar items, quantity information for similar items, and publicly available information related to the similar items. For example, the communication module 302 may be configured to query publicly available information resources to determine general availability criteria including stock information for a business offering similar items as well as any other suitable news such as branch openings/closings or out of stock information which may affect the price and quantity of items which in turn can affect the inventory level for similar items.

The price determination module 300 with the machine learning module 306 may be enabled to utilize the merchant information and merchant responses or feedback on prices offered by merchants with regards to a particular item, and price information from an electronic marketplace associated with the inventory and delivery management to determine a price for the item. The determined price may be provided to the user that orders the item and may be offered to the merchant when querying for merchants that wish to opt-in to fulfill the order as described herein. In embodiments, the modules 300 and 306 may receive price information from third parties or other resources to use as an additional data point in determining the price utilized to offer the item to the user and opt-in the merchant. For example, the communication module 302 may receive price information from other retailers offering the same item and stock market information for companies offering similar items. The machine learning module 306 may determine sub categories of items offered by a merchant with finer granularity down to specific items offered by a merchant based on the merchant information and merchant responses to queries/requests for fulfillment participation.

The communication module 302 and user interface module 308 may be enabled to generate a user interface for offering an item to a user, receiving input from the user regarding an order for the item, receive input from merchants, such as in response to a merchant query to fulfill the item, and indicate to the user that the item is available for delivery within a certain time frame. The communication module 302 may be utilized to query the merchants for fulfillment availability and provide the determined delivery information to a logistic agent or delivery actor to fulfill the order. In accordance with at least one embodiment, the merchant selection module 304 may be configured to select a subset of merchants from the plurality of merchants associated with the inventory and delivery determination feature as described herein. The merchant selection module 304 may utilize the determined inventory level, probability and threshold comparison, merchant information, and customer location information/order information to determine the subset of merchants to query. It should be noted that any single data point or combination of data points previously described herein may be utilized by the merchant selection module 304 to determine the subset of merchants to query for fulfillment availability. The merchant selection module 304 may select a particular merchant from the subset of merchants based at least in part on the lowest price offered by the merchant to fulfill the order, the geographically closest merchant to the customer, and the merchants rating to select the particular merchant. In an embodiment, the communication module 302 and the merchant selection module 304 may inform the other merchants included in the subset that they have not been selected to fulfill the order. In an embodiment, the merchant selection module 304 may blacklist or prohibit particular merchants from being selected or even queried to fulfill received requests for items. A merchant may be prohibited from fulfilling orders based on their merchant ratings which were derived from user feedback including the inability for a merchant to fulfill an order after being selected. The merchant selection module 304 and the communication module 302 may provide information associated with a merchant's rating to the merchant to aid in improving their rating. For example, if a merchant's ratings start to decrease, the modules 304 and 302 may generate and provide a report which includes instances of inability to fulfill orders after being selected and specific feedback from users regarding items fulfilled by the particular merchant. The merchant may utilize the report to attempt to fix the problems associated with their inability to fulfill orders or the quality of items provided during order fulfillment. The merchant selection module 304 and the communication module 302 may also provide a warning to merchants informing them that they are blacklisted from being selected to fulfill orders.

The logistic delivery module 310 with the machine learning module 306 may be configured to determine an efficient delivery path for the logistic agent to utilize when fulfilling the order to the customer from the selected merchant. The efficient delivery path for the logistic agent may be determined by the machine learning module 306 utilizing feedback from the logistic agent regarding previously provided paths, new paths, and user feedback which may indicate paths that led to faster or slower than anticipated delivery. The logistic delivery module 310 and the communication module 302 may be used to track and locate the logistic agent and order until the order has been fulfilled to the customer. The logistic delivery module 310 and the user interface module 308 may generate a map that includes the agent's position, the customer's delivery selection, and the merchant's location for tracking the order to complete. The generated map may be provided to the user via the UI described above.

Figure 4:
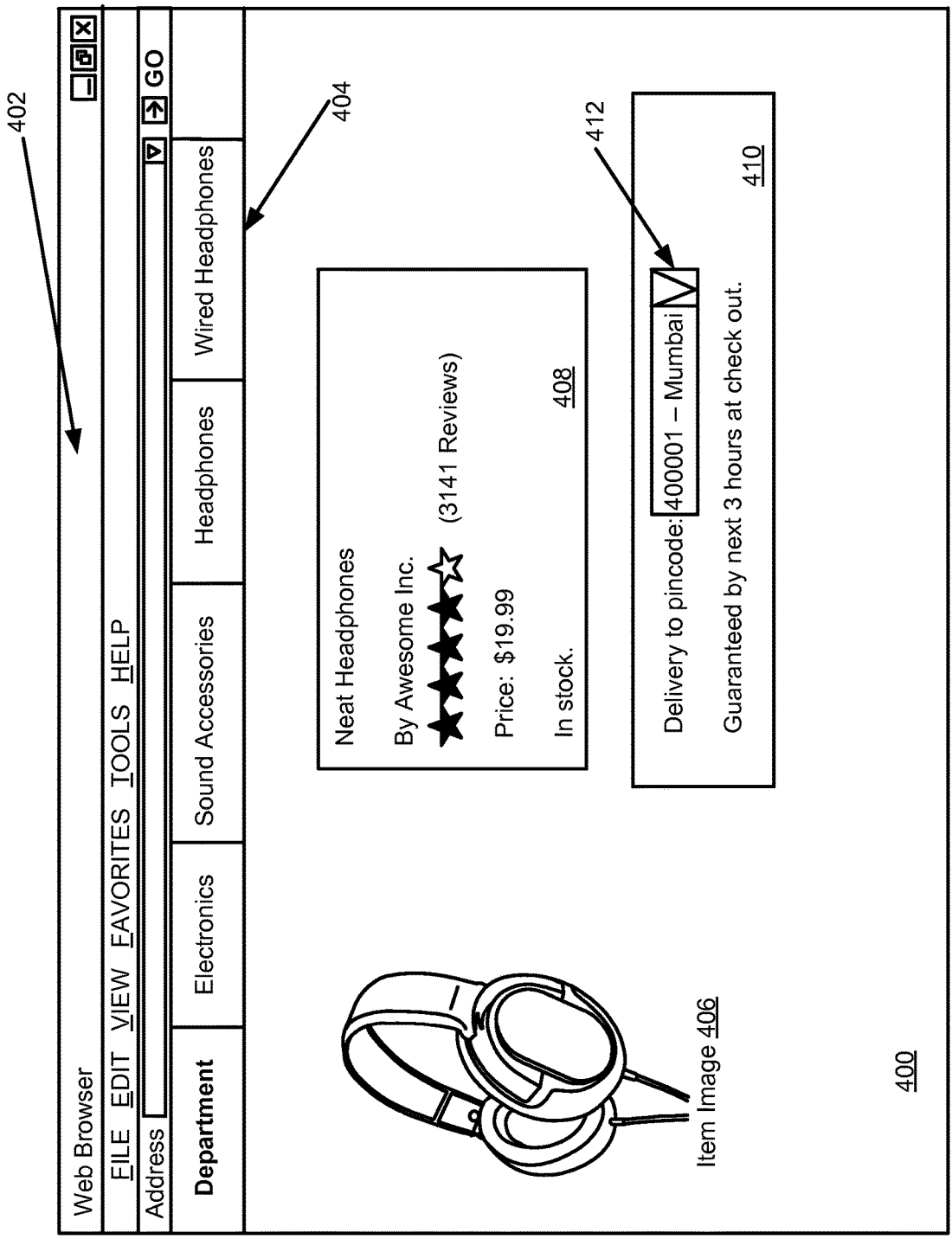
FIG. 4 illustrates an item order network document example including an inventory and delivery management feature in accordance with at least one embodiment.

FIG. 4 illustrates an item order network document example including an inventory and delivery management feature in accordance with at least one embodiment. The network document 400 may be presented via a web browser or browser application 402 (such as browser application 206 from FIG. 2). The network document 400 may include a browse path 404 of categories of items that the user had explored before arriving at a particular item. The browse path 404 may include a plurality of categories of items offered by an online retailer such as an electronic marketplace that is associated with the inventory and delivery management described herein. The network document 400 may also display an item image 406 for the particular item with associated information about the item 408 including a description of the item, a price of the item, user reviews for the item, and whether the item is currently in stock with the online retailer. In accordance with at least one embodiment, the network document 400 may also indicate to a user (such as user 202) that fast delivery for the item may be available with a certain time frame (as displayed in FIG. 4 a 3 hour time window) 410.

As described above, the inventory and delivery management module 232 (FIG. 2) may utilize a machine learning algorithm to determine an inventory level from merchants that are geographically local to the user viewing the headphone item 406 presented in FIG. 4. Based on the determined inventory level exceeding a threshold for the headphone item 406, a subset of merchants may be queried to fulfill the order of the headphone item at a price lower than the price included in the item information 408 ($19.99). Based on the responses received from the subset of merchants, the inventory and delivery management module 232 may select a particular merchant for fulfilling the order and provide instructions to update the network document to include the fast delivery information 410 that will be provided to the user. In embodiments, a determined location 412 of the user may also be provided, via the network document 400 to confirm the correct selection of local merchants to fulfill the order for the headphone item 406 had been selected and to ensure efficient delivery of the item.

The determined location feature 412 may also be enabled to receive input from the user to update the user's location if the provided location is incorrect or needs to be updated via the network document 400. As described herein, user information including location information or item information including shipping information may be utilized by the machine learning algorithms to select the appropriate subset of merchants to query for fulfillment availability. In an embodiment, the machine learning algorithm may be a supervised machine learning algorithm that is provided with an initial data set of user orders and merchant information. As users and merchants provide more responses and feedback the supervised machine learning algorithm will learn and update inventory levels for items. Other machine learning algorithms may be utilized such as using linear regression or random forest techniques.

The machine learning algorithm utilized by the inventory and delivery management module 232 may provide finer granularity for inventory levels associated with an item offered by an online retailer or electronic marketplace. For example, as the machine learning algorithm processes more feedback from merchants and users, items may have varying inventory levels for different times of the day and different days of the week. The inventory and delivery management module 232 using a machine learning algorithm may also determine a threshold associated with each item. The threshold may represent the amount or level of inventory that must be present within the subset of merchants in order for the order to be successfully fulfilled within the time frame. The inventory and delivery management module 232 may determine to not offer delivery within a certain time frame to the user if the number of responses of interested merchants is below the threshold as well. This will ensure that an offer for fast delivery is not made to the user, via the user interface, that the inventory and delivery management feature cannot fulfill. Fast moving inventory such as bread or diapers may have different thresholds than slower moving inventory such as apples or ice cream. The inventory and delivery management module 232 may analyze merchant responses to queries for order fulfillment or merchant information to learn the thresholds associated with each item offered via an electronic marketplace or online retailer. The threshold may also be dynamically updated by a machine learning algorithm using data points described above such that different thresholds exist for an item to correspond to various times of day or the days of a week.

Figure 5:
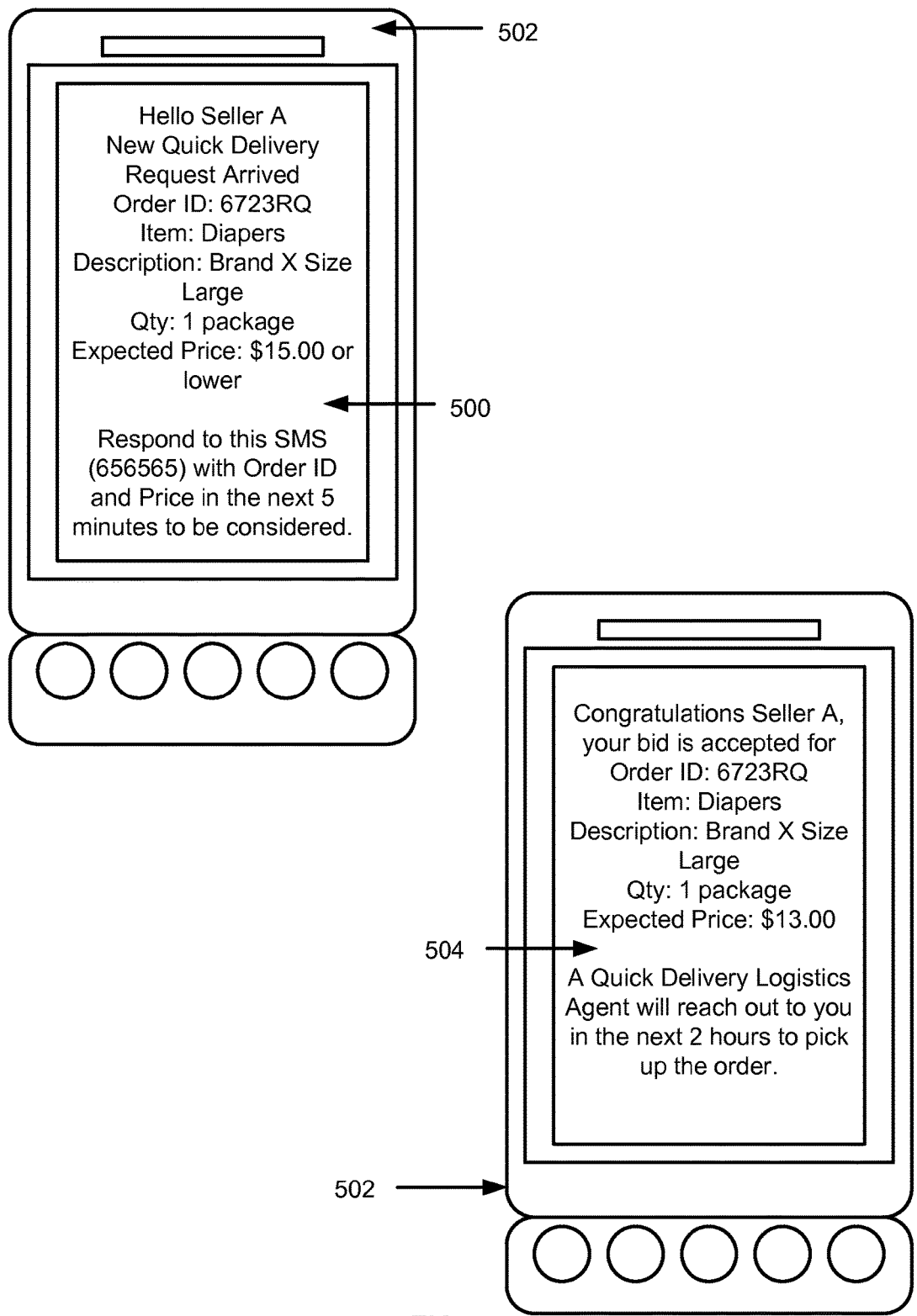
FIG. 5 illustrates an example merchant query and merchant confirmation associated with an inventory and delivery management feature in accordance with at least one embodiment.

FIG. 5 illustrates an example merchant query and merchant confirmation associated with inventory and delivery management in accordance with at least one embodiment. FIG. 5 includes a merchant query or request for merchant response 500 that may be provided to a merchant included in the determined subset of merchants that are geographically close to the customer/user ordering an item. In embodiments, the merchant may receive the merchant query 500 via a user device 502 (similar to the user device(s) 204) such as a mobile telephone. The merchant query/request may be generated by the inventory and delivery management module 232 as described in FIGS. 2 and 3 above. The merchant query/request for merchant response 500 may indicate an order identifier, a description of the item being ordered by the user, a further description associated with the item (such as size or color attributes associated with the item or any suitable variation of an item), a quantity of the item being ordered, and an expected price that the merchant must meet or offer below to be considered for selection by the inventory and delivery management described herein. The merchant query or request for merchant response may be provided to the merchant in the form of an short message service (SMS) text such as in FIG. 5, or via an instant message provided via an instant messenger application, an email, a telephone call, a standalone application configured to run on a user device, or any other suitable means of communicating order information to the merchant.

The merchant query/request for merchant response may indicate a time period for the potentially selected merchant to respond by as well as instructions on how to respond if they are interested in fulfilling the order. The response to the query/request provided by the merchant may include information such as the expected price and available quantity (if they can only provide half or a portion of the quantity requested in the order). As described above, the inventory and delivery management, via the module 232 for example, may analyze each merchant response and select a merchant based on merchant location, merchant rating, and the price included in the merchant response. If a merchant is selected they may receive a merchant confirmation 504 that may be received via a user device 502 as illustrated in FIG. 5. The merchant confirmation 504 may be generated and provided by the inventory and delivery management module 232 as described above. The merchant confirmation 504 may include the same order identifier, the item description, further description information, quantity ordered or to be provided by the merchant, and the expected price that the merchant is offering the item for. The merchant confirmation 504 may also provide logistic agent or delivery actor information which may detail when or how the delivery actor will pick up the item for fulfillment of the order to the user/customer. The merchant confirmation 504 as illustrated in FIG. 5 describes that a logistic agent will contact the selected merchant within 2 hours to pick up the order for delivery to the customer. The merchant confirmation 504 may also be provided as a short message service (SMS) text such as in FIG. 5, or via an instant message provided via an instant messenger application, an email, a telephone call, a standalone application configured to run on a user device, or any other suitable means of communicating order information to the merchant.

Figure 6:
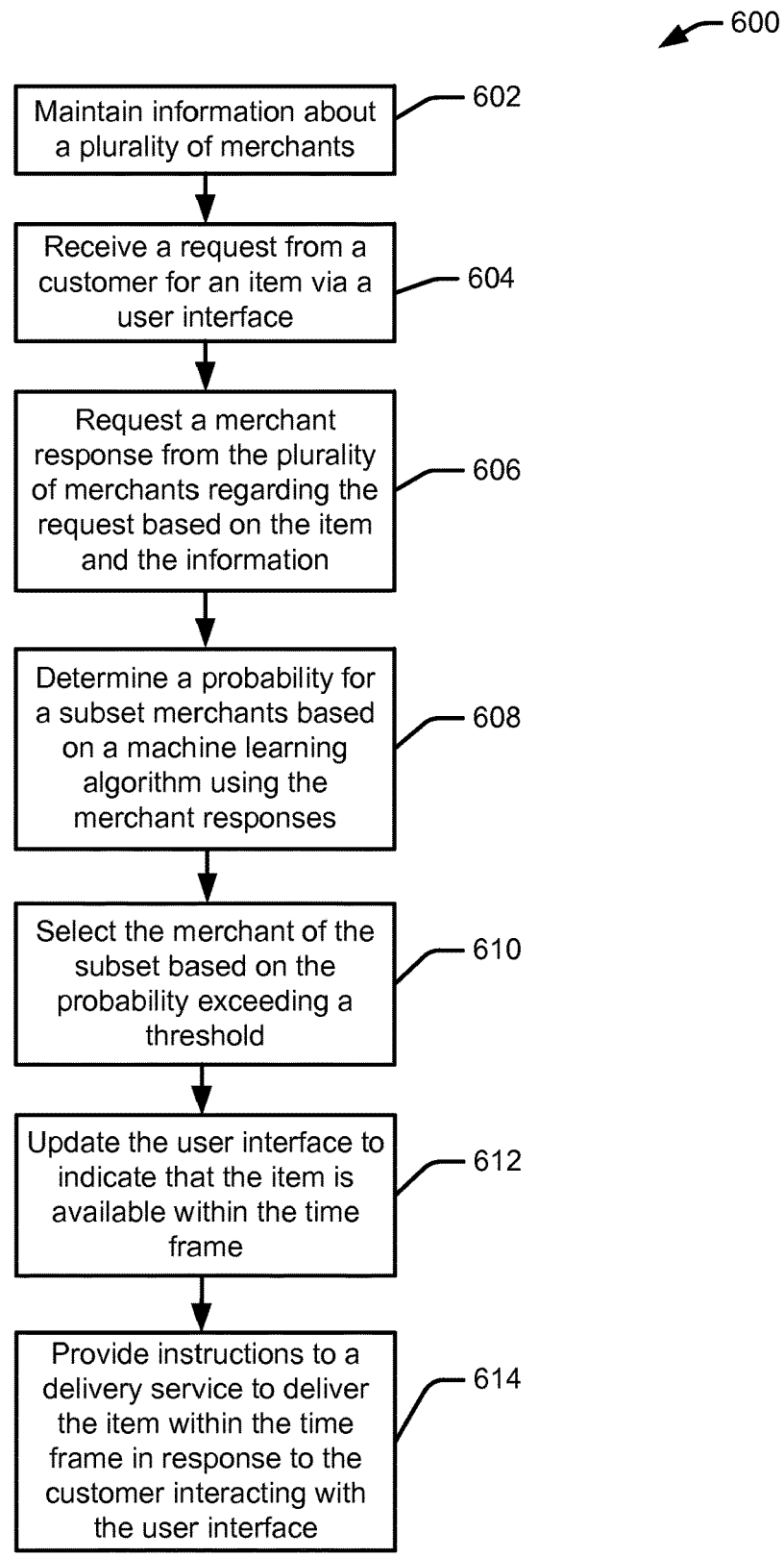
FIG. 6 is a flow diagram of a process for inventory and delivery management in accordance with at least one embodiment.

FIG. 6 is a flow diagram of a process 600 for an inventory and delivery management feature in accordance with at least one embodiment. This process is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the process (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 210 (e.g., utilizing at least one of the inventory and delivery management module 232, the price determination module 300, the communication module 302, the merchant selection module 304, the machine learning module 306, the user interface module 308, and the logistic delivery module 310 in communication with one or more data stores 312) shown in FIGS. 2 and 3, may perform the process 600 of FIG. 6. In FIG. 6 the process 600 may include maintaining information about a plurality of merchants at 602. As described above, the merchant information or information about a plurality of merchants may be maintained by the inventory and delivery management module 232 and stored in data store 312. In embodiments, the service associated with the inventory and delivery management feature described herein may provide instructions to logistic agents to obtain the merchant information from a plurality of merchants within a certain geographic location. The information provided by the merchants can be updated by the merchants themselves at any time.

The process 600 may include receiving a request from a customer for an item via a user interface at 604. For example, the user interface presented via the network document of FIG. 5 may receive input from the user that they wish to order an item. The plurality of merchants may be queried or receive a request for merchant responses regarding the received request for the item based on the item included in the request and the information about the plurality of merchants at 606. In embodiments, the one or more service provider computers 210 utilizing at least the inventory and delivery management module 232 may identify a subset of merchants from a plurality of merchants for fulfilling the request within a time frame based on the geographic range. The geographic range may be based on the geographic location of the customer. The process 600 may include determining a probability for a subset of merchants based on a machine learning algorithm using the merchant responses at 608. In an embodiment, the one or more service provider computers 210 may determine a probability of a likelihood that a merchant of the subset will fulfill the request within the time frame and below a price where the probability may be based on the machine learning algorithm utilizing the merchant responses. The merchant responses may include responses to previous requests for the item included in the request by other customers within a second geographic range of the customer. In embodiments, the probability may indicate that a merchant in the subset will fulfill the order within a time frame and below a calculated price. The process 600 may include selecting a merchant of the subset of merchants based on the probability exceeding a threshold at 610. As described above, the inventory and delivery management module 232 may select a particular merchant only if the probability exceeds a threshold associated with the item. This can ensure that the quick delivery option is only provided to the user when a high likelihood exists that the order will be fulfilled with the time frame.

The process 600 may include updating the user interface to indicate that the item is available within the time frame at 612. In accordance with at least one embodiment, the inventory and delivery management module 232 may provide instructions to update the UI with fast delivery information (delivery for the item available within the time frame for a local merchant). The user may also provide confirmation of their location or shipping destination via the UI and communicated to the inventory and delivery management module 232 for updating the order information or starting the process over if an incorrect address was utilized for selecting the subset of merchants and determining an inventory level for the item. The process 600 may conclude at 614 by providing instructions to a logistic agent or delivery service to deliver the item within the time frame. In an embodiment, the inventory and delivery management module 232 may provide the instructions in response to the customer interacting with the user interface such as opting in for the fast delivery via a local merchant within the time frame.

The instructions to the logistic agent may be provided as a short message service (SMS) text such as in FIG. 5, or via an instant message provided via an instant messenger application, an email, a telephone call, a standalone application configured to run on a user device, or any other suitable means of communicating order information to the logistic agent. In accordance with at least one embodiment, a customer or user who receives the item from the logistic agent may be required to provide a signature as confirmation of receipt of the item. The confirmation of receipt by the customer/user may also provide an important time stop data point for the inventory and delivery management module 232 to update inventory levels, merchant information, and delivery paths for logistic agents and ensure that items are being delivered within the time frame provided to the customer/user via the UI.

Figure 7:
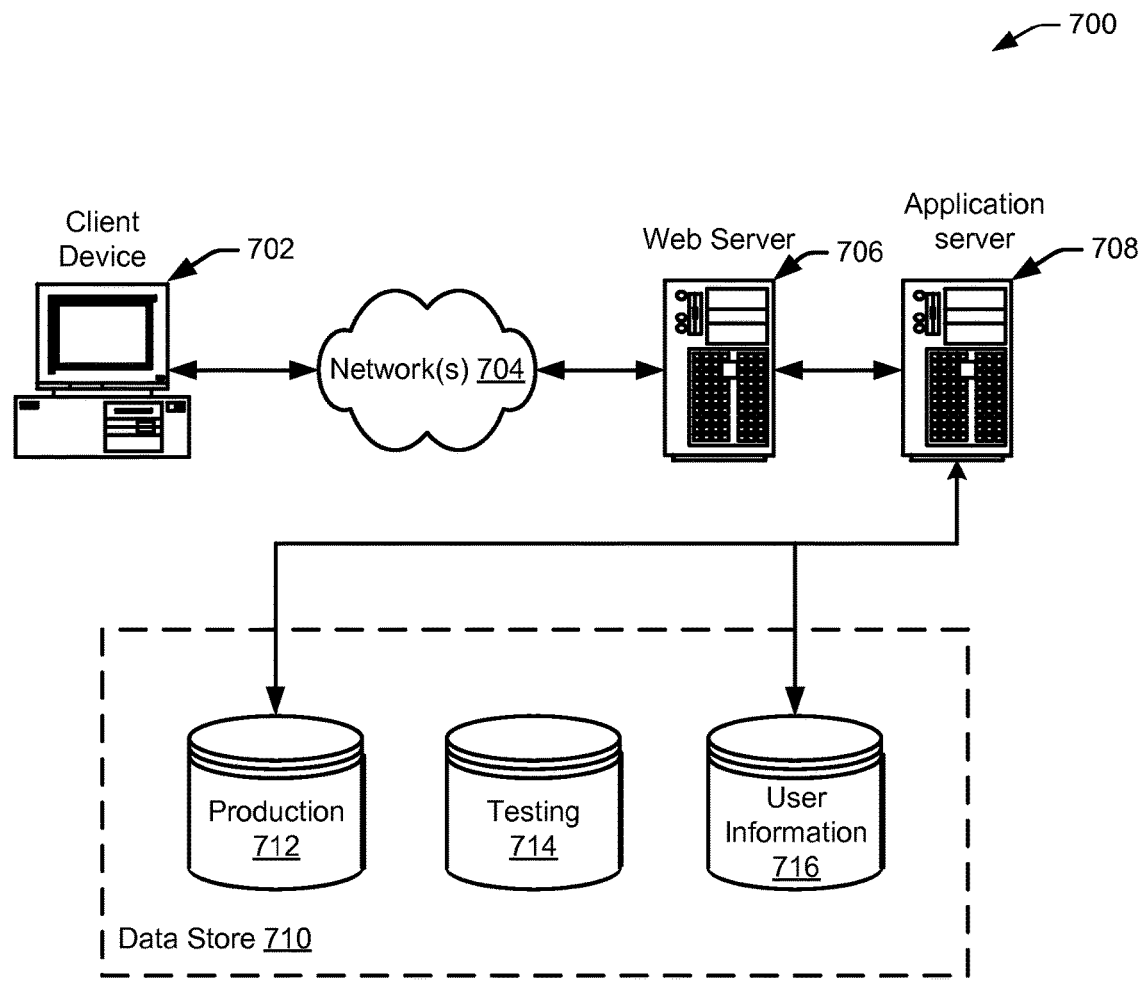
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a network document that the user is able to view via a browser on the user device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for managing inventory of items offered by a plurality of merchants within a geographic range of a customer, comprising:
   maintaining, by a computer system, information about the plurality of merchants associated with an electronic marketplace, the information comprising categories of the items offered by the plurality of merchants and geographic location information of the plurality of merchants;
   receiving, via a user interface, a request from the customer for an item offered by, the electronic marketplace;
   identifying a subset of merchants from the plurality of merchants for fulfilling the request within a time frame based at least in part on the geographic range, the geographic range based at least in part on a geographic location of the customer;
   identifying, for each merchant of the subset of merchants, an inventory level for the item based at least in part on previously fulfilled orders for the item;
   identifying, for each merchant of the subset of merchants, a merchant rating based at least in part on the inventory level, past deliveries made by each merchant for the item, and indications that the past deliveries for the item were made within the time frame;
   determining, by the computer system, a probability that a merchant of the subset will fulfill the request within the time frame and below a price, the probability based at least in part on a machine learning algorithm utilizing merchant responses to previous requests for the item by other customers, the inventory level for the item associated with the merchant, and the merchant rating for the merchant;
   requesting the merchant responses from the subset of the merchants regarding the request based at least in part on the probability exceeding a threshold for the item, the threshold determined based at least in part on the item included in the request;
   selecting the merchant of the subset based at least in part on the merchant responses and the geographic location of the merchant being within the geographic range of the customer;
   updating the user interface to indicate that the item is available within the time frame; and
   providing instructions to a delivery service to deliver the item within the time frame in response to the customer interacting with the user interface to order the item.

2. The computer-implemented method of claim 1, wherein the threshold is associated with an identified quantity of the item available from the subset of the merchants within the time frame.

3. The computer-implemented method of claim 1, further comprising:
   determining the geographic location of the customer based at least in part on customer information; and
   requesting the merchant responses from the plurality of merchants regarding the request based at least in part on the geographic location of the customer.

4. The computer-implemented method of claim 3; further comprising selecting the merchant of the subset based at least in part on the determined geographic location of the customer and the information about the plurality of merchants.

5. The computer-implemented method of claim 1, wherein the price is determined based at least in part on the machine learning algorithm utilizing the merchant responses, the information about the plurality of merchants, and item information of the item included in the request that is maintained by the electronic marketplace.

6. A non-transitory computer-readable storage medium storing computer-executable instructions for managing inventory of items offered by a plurality of merchants within a geographic range of a customer that, when executed by a computer system, configure the computer system to perform operations comprising:
   maintaining information about the plurality of merchants associated with an electronic marketplace, the information comprising categories of the items offered by the plurality of merchants and geographic location information of the plurality of merchants;
   receiving, via a user interface, a request from the customer for an item offered by the electronic marketplace;
   identifying a subset of merchants from the plurality of merchants for fulfilling the request within a time frame based at least in part on the geographic range, the geographic range based at least in part on a geographic location of the customer;
   identifying, for each merchant of the subset of merchants, an inventory level for the item based at least in part on previously fulfilled orders for the item;
   identifying, for each merchant of the subset of merchants, a merchant rating based at least in part on the inventory level, past deliveries made by each merchant for the item, and indications that the past deliveries for the item were made within the time frame;
   determining a probability that a merchant of the subset will fulfill the request within the time frame and below a price, the probability based at least in part on a machine learning algorithm utilizing merchant responses to previous requests for the item by other customers, the inventory level for the item associated with the merchant, and the merchant rating for the merchant;
   requesting the merchant responses from the subset of the merchants regarding the request based at least in part on the probability exceeding a threshold for the item; the threshold determined based at least in part on the item included in the request;
   selecting the merchant of the subset based at least in part on the merchant responses and the geographic location of the merchant being within the geographic range of the customer;
   updating the user interface to indicate that the item is available within the time frame; and
   providing instructions to a delivery service to deliver the item within the time frame in response to the customer interacting with the user interface to order the item.

7. The non-transitory computer-readable storage medium of claim 6, wherein the threshold is associated with an identified quantity of the item available from the subset of the merchants within the time frame.

8. The non-transitory computer-readable storage medium of claim 6, further comprising:
   determining the geographic location of the customer based at least n part on customer information; and requesting the merchant responses from the plurality of merchants regarding the request based at least in part on the geographic location of the customer.

9. The non-transitory computer-readable storage medium of claim 8, further comprising selecting the merchant of the subset based at least in part on the determined geographic location of the customer and the information about the plurality of merchants.

10. The non-transitory computer-readable storage medium of claim 6, wherein the price is determined based at least in part on the machine learning algorithm utilizing the merchant responses, the information about the plurality of merchants, and item information of the item included in the request that is maintained by the electronic marketplace.

11. A computer system for managing inventory of items offered by a plurality of merchants within a geographic range of a customer, comprising:
 a processor; and
 memory including computer-executable instructions that, when executed by the processor, cause the system to at least:
  maintain information about the plurality of merchants associated with an electronic marketplace, the information comprising categories of the items offered by the plurality of merchants and geographic location information of the plurality of merchants;
  receive, via a user interface, a request from the customer for an item offered by the electronic marketplace;
  identify a subset of merchants from the plurality of merchants for fulfilling the request within a time frame based at least in part on the geographic range, the geographic range based at least in part on a geographic location of the customer;
  identify, for each merchant of the subset of merchants, an inventory level for the item based at least in part on previously fulfilled orders for the item;
  identify, for each merchant of the subset of merchants, a merchant rating based at least in part on the inventory level, past deliveries made by each merchant for the item, and indications that the past deliveries for the item were made within the time frame;
  determine a probability that a merchant of the subset will fulfill the request within the time frame and below a price, the probability based at least in part on a machine learning algorithm utilizing merchant responses to previous requests for the item by other customers, the inventory level for the item associated with the merchant, and the merchant rating for the merchant;
  request the merchant responses from the subset of the merchants regarding the request based at least in part on the probability exceeding a threshold for the item, the threshold determined based at least in part on the item included in the request;
  select the merchant of the subset based at least in part on the merchant responses and the geographic location of the merchant being within the geographic range of the customer;
  update the user interface to indicate that the item is available within the time frame; and
  provide instructions to a delivery service to deliver the item within the time frame in response to the customer interacting with the user interface to order the item.

12. The system of claim 11, wherein the threshold is associated with an identified quantity of the item available from the subset of the merchants within the time frame.

13. The system of claim 11, wherein the computer-executable instructions further cause the system to at least:
 determine the geographic location of the customer based at least in part on the customer information; and
 request the merchant responses from the plurality of merchants regarding the request based at least in part on the geographic location of the customer.

14. The system of claim 13, wherein the computer-executable instructions further cause the system to at least select the merchant of the subset based at least in part on the determined geographic location of the customer and the information about the plurality of merchants.

15. The system of claim 11, wherein the price is determined based at least in part on the machine learning algorithm utilizing the merchant responses, the information about the plurality of merchants, and item information of the item included in the request that is maintained by the electronic marketplace.

* * * * *

UNITED STATES PATENT AND TRADEMARK OFFICE
CERTIFICATE OF CORRECTION

PATENT NO. : 10,242,336 B1
APPLICATION NO. : 14/558494
DATED : March 26, 2019
INVENTOR(S) : Vaibhav Agarwal et al.

Page 1 of 1

It is certified that error appears in the above-identified patent and that said Letters Patent is hereby corrected as shown below:

In the Claims

Column 19, Line 17, Claim 1:
Delete: "customer for an item offered by, the electronic market"
Insert: --customer for an item offered by the electronic market--

Column 19, Line 64, Claim 4:
Delete: "The computer-implemented method of claim 3; further"
Insert: --The computer-implemented method of claim 3, further--

Column 20, Line 46, Claim 6:
Delete: "on the probability exceeding a threshold for the item;"
Insert: --on the probability exceeding a threshold for the item,--

Column 20, Line 65, Claim 8:
Delete: "based at least n part on customer information: and"
Insert: --based at least in part on customer information; and--

Signed and Sealed this
Sixth Day of August, 2019

Andrei Iancu
*Director of the United States Patent and Trademark Office*